United States Patent Office.

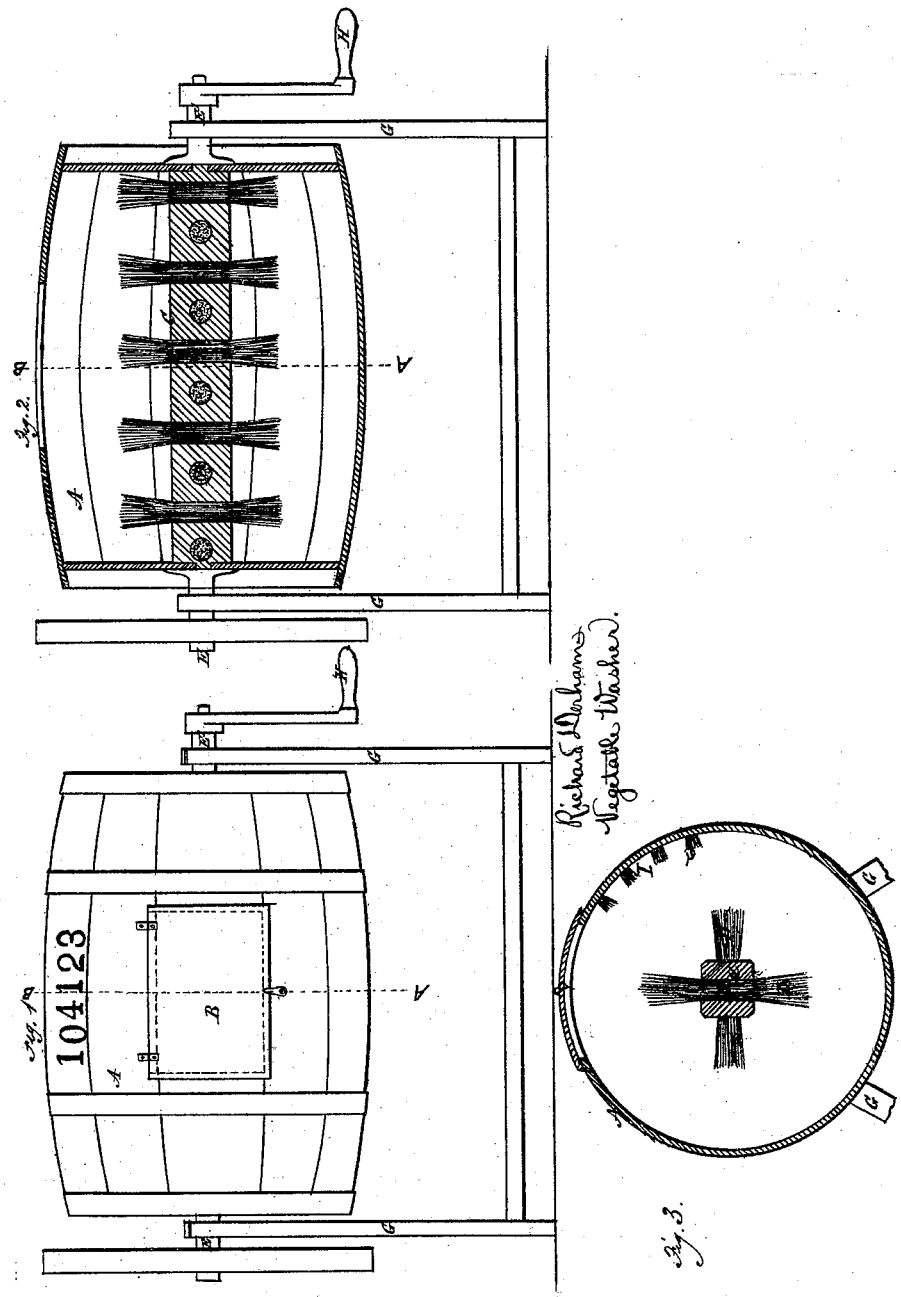

RICHARD DERHAM, OF BERMONDSEY, ENGLAND.

Letters Patent No. 104,123, dated June 14, 1870.

IMPROVED VEGETABLE WASHER.

The Schedule referred to in these Letters Patent and making part of the same.

*To all to whom it may concern:*

Be it known that I, RICHARD DERHAM, of Bermondsey, in the county of Surrey, England, have invented an "Improved Machine or Apparatus for Washing Potatoes," and other like vegetable substances; and I do hereby declare that the following is a full and exact description thereof, reference being had to the accompanying drawing and to the letters of reference marked thereon.

To enable others skilled in the art to make and use my invention, I will proceed to describe its construction and operation.

This invention consists of a machine or apparatus of the following construction:

A circular tub or vessel, mounted horizontally by its ends on axes or pivots, working in bearings at the top of suitable standards. Within the aforesaid tub or vessel, and around the inside, or to the center thereof, or both, I fix to the ends of the said tub or vessel, and to the inside thereof, brushes formed of bass, or other suitable material. There is a hole or opening formed in one of the staves of the aforesaid tub or vessel, fitted with a lid for charging the tub or vessel with potatoes, or other vegetables, to be washed. There is a handle fixed onto one of the axes of the tub for imparting rotary motion thereto, so that, supposing the said tub to be charged with potatoes, or other vegetables, and water, and the lid fixed water-tight thereon, the effect will be as follows: As the potatoes or other vegetables are carried round by the rotation of the tub, and the potatoes or other vegetables come over the brushes, they will fall thereonto, and so on throughout the rotations of the tub, by which the dirt will be thoroughly removed from the eyes and other parts of the skins of the potatoes or other vegetables, after which the vegetables and water may be discharged by opening the lid and turning the opening in the barrel downward.

Description of the Drawing.

Figure 1 represents an outside elevation of a machine, constructed according to this invention.

Figure 2, a longitudinal and vertical section of the said machine through the center thereof.

Figure 3, a tranverse and vertical section, through the line A B, at figs. 1 and 2.

At each of the above figures, which are drawn to a scale of one-fourth of the full size of a small machine, similar letters of reference are placed upon corresponding parts wherever they appear.

At each of such said figures, A marks a tub fitted with a water-tight lid, B; C a square wooden axle fitted, by its ends, into the ends of the tub.

A D D bundles of bass, cocoa-nut fibre, or other suitable rigid substance, forming brushes, which are each passed through and fixed in holes in the axle C, one row of the said brushes being at right angles to the other row.

E E' are metal axles or pivots fixed to the ends of the tub A for the tub to rotate upon, the said pivots being mounted in bearings in the standards G.

H is a winch-handle, fixed on the pivot E', for imparting rotary motion to the tub A, so that, supposing potatoes, or other similar substances, and water to be placed in the tub, and rotary motion imparted thereto, the effect will be to cause the potatoes to fall onto the ends of the brushes, and thereby remove dirt from the potatoes or other vegetable substances, and thoroughly cleanse them. The inside of the tub may have brushes fixed thereto, if necessary, as at I, fig. 3.

It will be seen that I may employ ordinary casks or barrels to receive the articles to be cleansed, the brushes being arranged as described.

I am aware that revolving brushes have been applied to stationary tubs in a vertical position, but such constitute no part of my invention.

What I claim as my invention, and desire to secure by Letters Patent, is—

The horizontal shaft C, provided with a series of brushes, arranged within a revolving cask, and operating in connection with the series of brushes on the inner circumference of the cask, substantially as shown and described.

RICHD. DERHAM.

Witnesses:
ALEX. BROWNE, } 85 *Gracechurch Street,*
H. A. MALLYON. } *London.*